(12) United States Patent
Warmuth

(10) Patent No.: US 9,353,993 B2
(45) Date of Patent: May 31, 2016

(54) CONDENSATE TRAP HEATER FOR CONDENSING GAS FURNACE

(71) Applicant: CARRIER CORPORATION, Farmington, CT (US)

(72) Inventor: David D. Warmuth, Plainfield, IN (US)

(73) Assignee: CARRIER CORPORATION, Farmington, CT (US)

( * ) Notice: Subject to any disclaimer, the term of this patent is extended or adjusted under 35 U.S.C. 154(b) by 377 days.

(21) Appl. No.: 13/858,507

(22) Filed: Apr. 8, 2013

(65) Prior Publication Data

US 2013/0327761 A1 Dec. 12, 2013

Related U.S. Application Data

(60) Provisional application No. 61/656,761, filed on Jun. 7, 2012.

(51) Int. Cl.
| | |
|---|---|
| *H05B 1/02* | (2006.01) |
| *F27D 7/00* | (2006.01) |
| *F24H 8/00* | (2006.01) |
| *F24D 19/00* | (2006.01) |
| *H05B 3/34* | (2006.01) |

(52) U.S. Cl.
CPC ............... *F27D 7/00* (2013.01); *F24D 19/0095* (2013.01); *F24H 8/006* (2013.01); *H05B 3/34* (2013.01); *H05B 2203/002* (2013.01); *H05B 2214/02* (2013.01); *Y02B 30/106* (2013.01)

(58) Field of Classification Search
CPC ....... F27D 7/00; F24H 8/006; F24D 19/0095; H05B 3/34; H05B 3/36; H05B 2203/003; H05B 2214/02; Y02B 30/106
USPC .......... 219/494, 497, 505, 213, 528, 535, 490
See application file for complete search history.

(56) References Cited

U.S. PATENT DOCUMENTS 5,115,798 A * 5/1992 Moore et al. ................. 122/14.1
6,675,795 B2 1/2004 Videto et al.
(Continued)

FOREIGN PATENT DOCUMENTS

| JP | 9026291 A | 1/1997 |
|---|---|---|
| JP | 2008134012 A | 6/2008 |

OTHER PUBLICATIONS

Author Unknown, Chromalox Europe, http://www.directindustry.com/prod/chromalox-europe/flexible-heaters-23231-474518.html, pp. 1-2, accessed Jun. 7, 2012.

(Continued)

*Primary Examiner* — Mark Paschall
(74) *Attorney, Agent, or Firm* — Cantor Colburn LLP

(57) ABSTRACT

A heating mat for a condensate trap can include resistive traces which heat the mat. The mat can be adhered to the condensate trap, for example using pressure sensitive adhesive. A control thermostat monitors an ambient temperature and/or a temperature within the condensate trap. If a temperature is at or above a setpoint, the controller thermostat disables power to the resistive traces. If a temperature is below at or below a setpoint, the controller thermostat enables power to the resistive traces to heat the condensate trap and the condensate within the condensate trap. In an embodiment, the heating mat can operate at a voltage supplied by the furnace or from a power source external to the furnace.

16 Claims, 3 Drawing Sheets

(56) References Cited

U.S. PATENT DOCUMENTS

| | | | |
|---|---|---|---|
| 8,481,895 B2* | 7/2013 | Taylor et al. | 219/521 |
| 2006/0086717 A1* | 4/2006 | Oosterling | 219/528 |
| 2010/0000981 A1* | 1/2010 | Diemer et al. | 219/202 |
| 2010/0096378 A1* | 4/2010 | Baur et al. | 219/209 |
| 2011/0174289 A1 | 7/2011 | Paller et al. | |
| 2011/0192180 A1 | 8/2011 | Henderson et al. | |

OTHER PUBLICATIONS

Author Unknown, Makesafer Tech, http://www.alibaba.com/product-free/11992135/Flexible_Heater.html, pp. 1-2, accessed Jun. 7, 2012.

Author Unknwon, Technologic UK, http://www.t-uk.co.uk/heating-solutions.php, pp. 1-2, accessed Jun. 7, 2012.

* cited by examiner

CONDENSATE TRAP HEATER FOR CONDENSING GAS FURNACE

CROSS REFERENCE TO RELATED APPLICATION

This application claims priority to provisional U.S. patent application Ser. No. 61/656,761 filed Jun. 7, 2012, the disclosure of which is herein incorporated by reference in its entirety.

FIELD OF THE EMBODIMENTS

The present teachings relate to condensing gas furnaces and, more particularly to condensate traps for condensing gas furnaces.

BACKGROUND OF THE EMBODIMENTS

In a typical residential or commercial furnace, a fuel, for example natural gas, is combusted in a burner to heat air provided through an air intake vent pipe. Heat is extracted from the combustion gases through a heat exchanger, then the combustion gases are exhausted from an exhaust vent pipe. A byproduct of natural gas combustion is water vapor which, in lower efficiency furnaces, is typically exhausted with other combustion gases from the exhaust vent pipe.

In higher efficiency furnaces, the combustion gas can be routed through a primary heat exchanger and also a secondary heat exchanger to improve the extraction of heat to improve overall efficiency. The improved extraction of heat lowers the temperature of the exhaust gases and results in condensation of the water vapor into liquid water within the heat exchanger. This water is collected and temporarily stored in a condensate trap until it is disposed of, typically by draining the collected water from the condensate trap via gravity into a drain or onto the ground.

Gas furnaces are sometimes installed in an unheated attic or garage where the ambient temperature can drop below freezing. A lower efficiency furnace which exhausts the water vapor at higher temperatures can be used for these installations, as the moisture remains a vapor until after it exits the exhaust pipe. To use a high efficiency furnace in locations where freezing temperatures are a concern, freeze protection can be used to prevent freezing of the collected water within the condensate trap. Freeze protection can include an electrical heating tape which is wound around the condensate trap to prevent freezing. Electrical heating tape is typically configured for 120 volts, which can require additional safety precautions such as ground fault circuit interrupt (GFCI) breakers, special enclosures, or other measures. In some future systems, the use of electrical heat tape may not be possible because of small spacing around the condensate trap. Other freeze protection is described in U.S. Pat. No. 6,675,795, which is incorporated herein by reference in its entirety.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

An embodiment of the present teachings can include a heating mat for a furnace condensate trap. The heating mat can include a resistive heating trace having a first end terminating in a first electrode and a second end terminating in a second electrode, a mat cable electrically coupled to the first electrode and the second electrode, wherein the mat cable is configured to supply power to the heating mat during operation of the heating mat, and an adhesive configured to attach the heating mat to one or more external surfaces of a furnace condensate trap, wherein the heating mat is configured to prevent freezing of water within the furnace condensate trap.

Another embodiment of the present teachings can include a furnace condensate trap. The furnace condensate trap can include a condensate trap body for storing a condensate, a condensate input pipe attached to the condensate trap body and configured to receive the condensate, a condensate output pipe attached to the condensate trap body and configured to drain the condensate from the furnace condensate trap, and a heater attached to one or more external surfaces of the condensate trap body with an adhesive. The heater can include a resistive heating trace and a heater cable electrically coupled to the resistive heating trace, wherein the heater cable is configured to supply power to the resistive heating trace during operation of the furnace condensate trap and the heating mat is configured to prevent freezing of water within the furnace condensate trap.

Another embodiment of the present teachings can include a method of heating a condensate trap, including attaching a heating element to one or more external surfaces of a furnace condensate trap with an adhesive, wherein the heating element includes a resistive heating trace interposed between a first dielectric polymer sheet and a second dielectric polymer sheet and a heater cable electrically coupled to the resistive heating trace, wherein the heater cable is configured to supply power to the resistive heating trace during operation of the furnace condensate trap and the heating element is configured to prevent freezing of water within the condensate trap.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to the present embodiments of the present teachings, an example of which is illustrated in the accompanying drawings. Wherever possible, the same reference numbers will be used throughout the drawings to refer to the same or like parts.

An embodiment of the present teachings can include a heater or heating element, for example a heating mat which can be wrapped around and adhered to a condensate trap, such that the heating mat fits conformally to the body of the condensate trap. One or more resistive heating traces within the mat can be used to maintain a temperature of water within the condensate trap above freezing. The heating mat can have a form factor which is configured for a specific condensate trap design, or the mat can be manufactured to fit a variety of different condensate traps. In an embodiment, the heating mat can be configured for low voltage operation, for example 24V, which is already typically supplied by a conventional furnace, thereby reducing or eliminating the need for additional wiring or safety precautions such as GFCI breakers. The mat can include an adhesive to simplify attachment of the heating mat to one or more external surfaces of the body of the condensate trap. In an embodiment, attachment of the mat can be performed at the factory such that an HVAC installer can order a heated condensate trap as needed. In another embodiment, an HVAC installer can order a mat as a separate stock item for custom attachment to a condensate trap which will be placed in a potentially freezing location.

For purposes of the present disclosure, a "heating mat" in accordance with an embodiment of a present teachings is a heater which includes resistive heating traces, wherein a thickness of the heating mat, including any dielectric layers and excluding electrode connections and cable, will have a thickness range of between about 0.67 mm and about 1.5 mm, or between about 0.8 mm and about 1.2 mm, or between about 0.85 mm and about 1.0 mm. An embodiment can include a flat profile within the stated range across the entire surface of the mat. In another embodiment, a heating mat in accordance with the present teachings can have a flat profile with a maximum thickness, excluding the electrode connections and cable, of about 1.45 mm, or about 1.26 mm.

Figure 1:
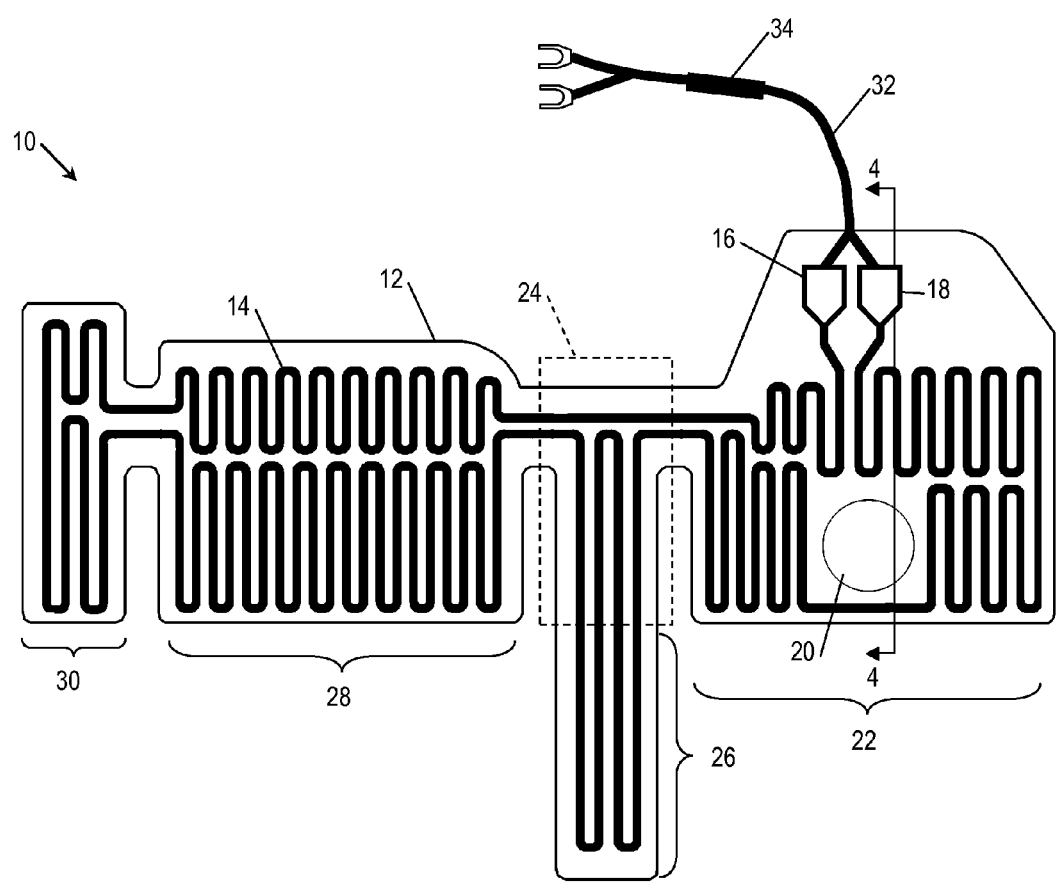
FIG. 1 is a schematic plan view depicting a heating mat in accordance with an embodiment of the present teachings.

FIG. 1 depicts an embodiment of a heating mat 10 having an outline (i.e., a footprint) 12 in accordance with an embodiment of the present teachings. The outline 12 can be a regular pattern such as a square or rectangular, irregular and customized to fit a particular model of condensate trap, or the outline can be designed with an outline which is likely to fit a plurality of different condensate trap models. Designing the mat outline for a customized fit for a particular condensate trap can improve heating efficiency over a mat which has a simple square or rectangular outline. The mat 10 can include one or more resistive heating traces 14, with each trace terminating at a first end in a first electrode (i.e., connector) 16 and at a second end in a second electrode 18. The heating traces 14 can be encased within, and interposed between, a first sheet 70 and a second sheet 72 as discussed below with reference to FIG. 4, which together form external surfaces of the mat 10. The mat 10 can further include any cutouts 20 necessary to conform to the form factor of the condensate trap, such as a condensate drain pipe (i.e., a condensate output pipe) extending from a face of the condensate trap.

In the embodiment of FIG. 1, the mat 10 can include five sections 22-30 which will cover five sides or faces of a six sided condensate trap. The heater trace 14 extends across at least a portion of each of the five sections. Using this configuration, five sides of the condensate trap can be heated using a single trace 14, with the trace extending across all five sections and terminating at the first end in a first electrode 16 and at the second end in a second electrode 18.

As depicted in FIG. 1, a first section 22 can cover a front face of the condensate trap, and includes a cutout 20 configured to receive a condensate drain pipe which extends from the front face of the condensate trap. A second section 24 is directly connected to the first section 22 and can cover a first side of the condensate trap. A third section 26 is directly connected to, and can continuously extend from, the second section 24 to wrap around a third side (i.e., a bottom) of the condensate trap, but is not directly connected to any other section. A fourth section 28 is directly connected to the second section 24 and covers a back face of the condensate trap which is opposite the front face. A fifth section 30 directly connected to the fourth section 28 and covers a second side of the condensate trap which is opposite the first side. The heating trace extends and meanders across all five sections to heat an interior of the condensate trap through all five faces.

In another embodiment, the third section 26 which wraps around the bottom of the condensate trap can be omitted to provide a mat with four sections 22, 24, 28, 30 that will cover four faces of a six sided condensate trap. The heating trace 14 extends and meanders across all four sections to heat an interior of the condensate trap through only four faces. It will be understood that the mat will be designed to provide an electrically continuous heating trace 14 between the electrodes 16, 18. This can result in a heating mat which is less expensive to manufacture than the five section embodiment resulting from a smaller outline, reduced trace length and, therefore, reduced materials.

In another embodiment, a heating mat 10 can include at least a first section 22 to cover a front face of a condensate trap, a second section 24 to cover a side of the condensate trap, and a third section 28 to cover a back of the condensate trap. The heater trace 14 extends and meanders across the first section 22, the second section 24, and the third section 28. Such a design can cover a majority of an external surface of the condensate trap, and require only a single heater trace 14 having a first end terminating in a first electrode 16 and a second end terminating in a second electrode 18. This embodiment can provide a mat with three sections 22, 24, 26 that will cover three faces of a six sided condensate trap, and will heat the interior of the condensate trap through only three sides. It will be understood that the mat will be designed to provide an electrically continuous heating trace between the electrodes 16, 18. This can result in a heating mat which is less expensive to manufacture than the four and five section embodiments resulting from a smaller outline, reduced trace length and, therefore, reduced materials.

In another embodiment, the third section 26 which wraps around the bottom of the condensate trap, the second section 24 which covers the first side of the condensate trap, and the fifth section 30 which covers the second side of the condensate trap can be omitted to provide a mat with two sections 22, 28 that will cover two sides of a six sided condensate trap. The trace can extend and meander across the two sections 22, 28, and extend directly across the second section 24 and first side of the condensate trap without meandering to electrically connect section 22 to section 28, while providing very small percentage of the total heating to the condensate trap. It will be understood that the mat will be designed to provide an electrically continuous heating trace between the electrodes 16, 18. This can result in a heating mat which is less expensive to manufacture than the three, four, and five section embodiments resulting from a smaller outline, reduced trace length and, therefore, reduced materials.

In another embodiment, a heating mat 10 can include only a single section 22 across which the trace 14 extends, meanders, and covers only a single face of the condensate trap, for example a front or back face of the condensate trap, to heat the interior of the condensate trap from only a single side. A heating mat 10 with only a single section 22 may supply sufficient heat to the condensate trap to prevent freezing of any condensate within, particularly if the trace 14 covers a majority of the surface area of the single face of the condensate trap. A design that covers only a single face would not require bending of the heater trace 14 which may improve reliability and may simplify installation. It will be understood that the mat will be designed to provide an electrically continuous heating trace between the electrodes 16, 18.

A pressure sensitive adhesive 76 (FIG. 4) can be used to attach a back side of the mat 10 to one or more external surfaces of a condensate trap. The adhesive can be applied to a back surface of the mat 10 at the time of installation, or the adhesive can be applied by the manufacturer as part of the manufacturing process, and protected by a removable cover 78 (FIG. 4) until installation of the mat. For installation, the removable cover can be stripped from the mat 10 to expose the adhesive 76.

Figure 4:
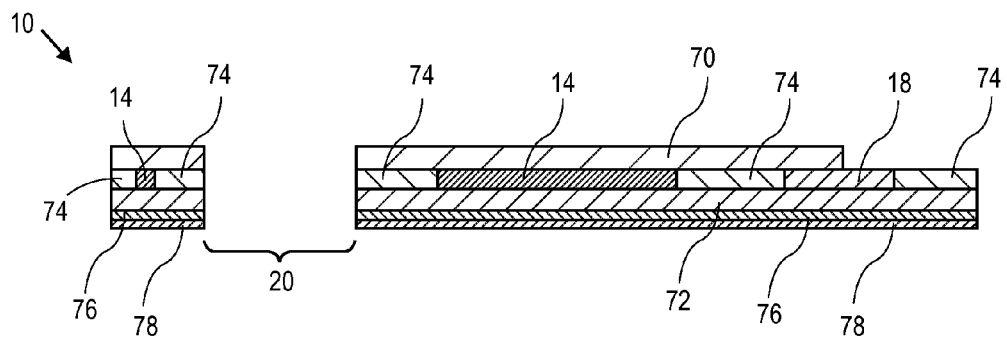
FIG. 4 is a magnified cross section along 4-4 of FIG. 1.

In use, the mat 10 can be wrapped around a condensate trap, applied to the condensate trap, and adhered to the condensate trap using the adhesive 76 (FIG. 4). The condensate trap can be installed within a furnace such as a high efficiency furnace during attachment of the mat 10, or the condensate trap can be configured for future installation within a furnace during attachment of the mat 10. A voltage, for example 24V, can be supplied across the electrodes 16, 18, for example from a 24V transformer within the furnace supplied through a mat cable 32. The mat cable 32 can have first and second wires as depicted, with each wire electrically coupled to one of the electrodes 16, 18, for example using solder or another electrical connection. The voltage across the electrodes 16, 18, results in heating of the resistive heating trace 14, which heats the condensate trap and the water within the condensate trap through conductive heating.

The mat can further include a control thermostat (e.g., a temperature sensor) 34 that monitors a temperature. The control thermostat 34 can be configured to selectively enable power to the traces 14 when a freezing temperature is detected (i.e., sensed) and to selectively disable power to the traces 14 when an above-freezing temperature is detected. The control thermostat 34 can be integrated into the cable 32 as depicted, into the mat 10, or placed at another location.

Figure 2:
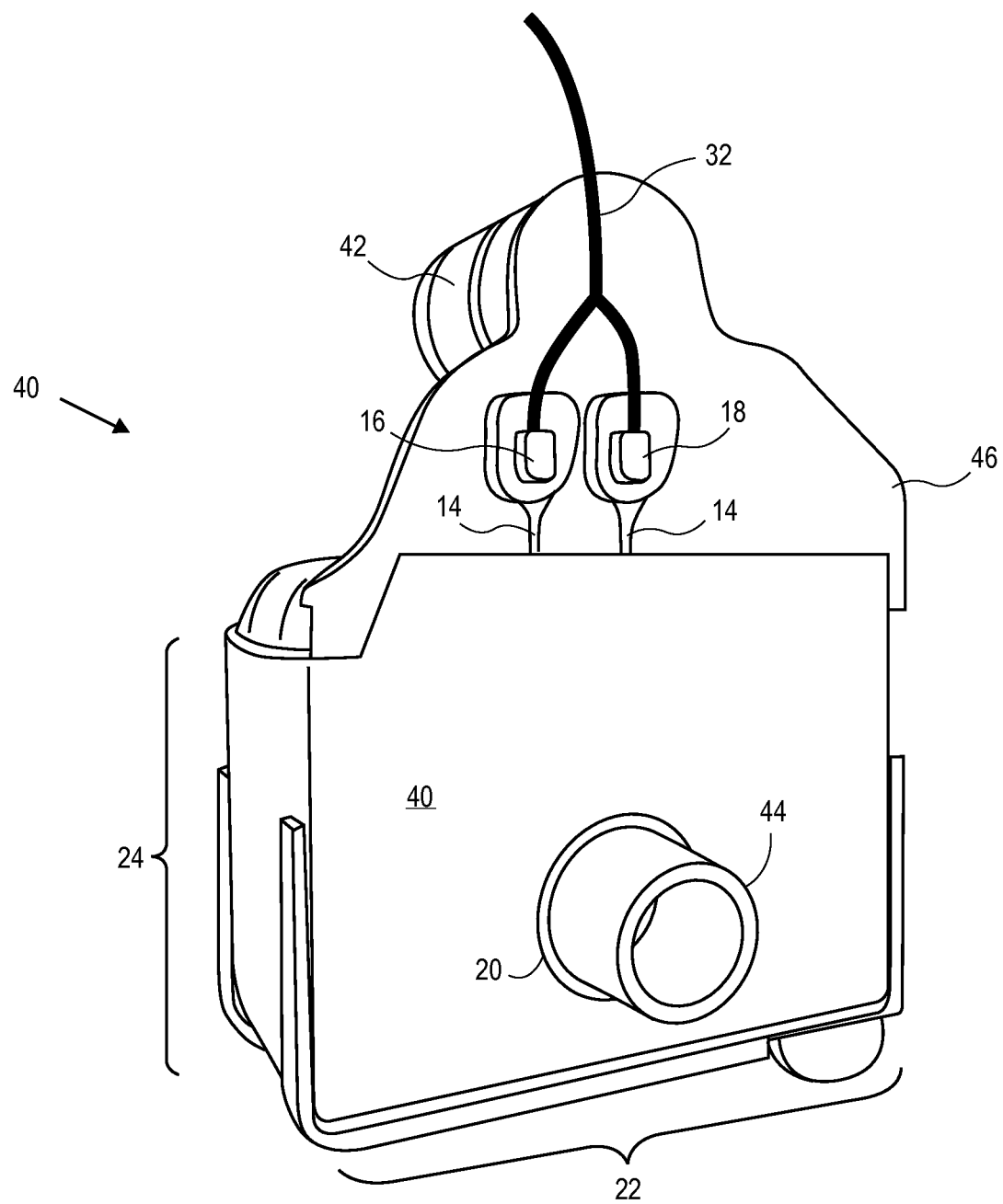
FIG. 2 is a perspective depiction of a condensate trap and a heating mat for heating the condensate trap in accordance with an embodiment of the present teachings.

FIG. 2 is a perspective depiction of a condensate trap 40 after attachment of the mat 10. The condensate trap 40 can include a condensate input pipe 42 which receives condensate from other parts of the furnace and a condensate output pipe 44 through which condensate is drained.

Figure 3:
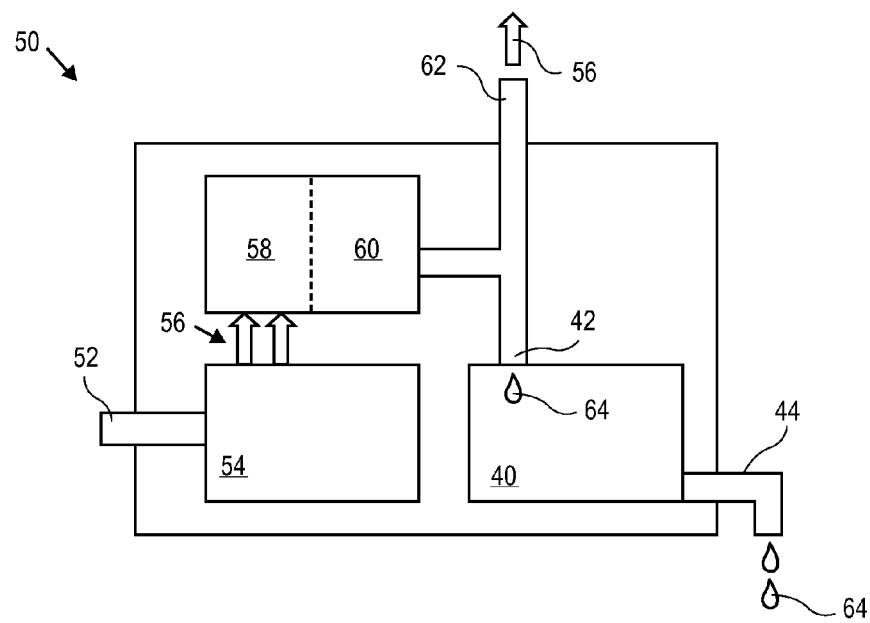
FIG. 3 is a schematic depiction of a furnace according to an embodiment of the present teachings, wherein the furnace includes a condensate trap and a heating mat as described herein.

FIG. 3 is a generalized schematic depiction of a furnace 50 in accordance with an embodiment of the present teachings. The furnace 50 can include a gas supply line 52 to input gas to a burner 54, within which gas combustion occurs. Combustion gases 56 are transferred to a primary heat exchanger 58 and a secondary heat exchanger 60 to extract heat from the combustion gases 56 and to heat air for delivery to the space to be heated. As the combustion gases 56 pass through the secondary heat exchanger 60, water vapor condenses into water 64 and drains to a collector box 62, which is then ducted into the condensate trap 40 through the condensate input pipe 42. The water 64 is then pumped or drained from the condensate trap 40 through the condensate output pipe 44.

In an embodiment, during operation of the furnace 50, the heating mat 10 covers the condensate trap 40 as depicted in FIG. 2. Further, the control thermostat 34 can monitor an ambient temperature during operation of the heating mat 10. While the temperature is maintained at or above a setpoint, for example 0° C., the control thermostat 34 disables power to the mat 10 such that the traces 14 are not heated. When the ambient temperature is at or below the setpoint, the control thermostat 34 enables power delivery to the mat 10 to resistively heat the traces 14. Heat is conducted from the traces 14, through a body 46 of the condensate trap 40, to the interior of the condensate trap 40 to heat the water condensate within to prevent freezing. Once the ambient temperature reaches the setpoint, the control thermostat 34 can disable power to the electrodes 16, 18 and thus to the trace 14 of the mat 10.

In an embodiment, the control thermostat 34 can monitor an interior temperature of the condensate trap 40 rather than, or in addition to, monitoring ambient temperature. The condensate trap 40 can include a temperature sensor or probe 66 located inside the condensate trap 40. The temperature sensor 66 can include a lead that terminates in a plug which can be accessed external to the condensate trap 40, and that plugs into a lead from the control thermostat 34 to provide an electrical connection 68 between the temperature sensor 66 and the control thermostat 34. The control thermostat 34 monitors the temperature from the interior temperature sensor 66 and disables power to the traces 14 when an interior temperature is at or above a setpoint, for example 5° C., and enables power to the traces 14 when the interior temperature is at or below the setpoint. This embodiment may assist in preventing overheating of the condensate trap 40 and in reducing power use.

FIG. 4 is a magnified cross section along 4-4 of FIG. 1. FIG. 4 depicts resistive heater trace 14 which terminates at a second end in second electrode 18. A conductive layer which forms both the resistive heater trace 14 and the electrodes 16, 18 can be a metal such as copper or silver, and can have a thickness of approximately 0.035 mm.

The resistive heater traces 14 are interposed between a first sheet 70 and a second sheet 72, each of which can be a dielectric polymer such as polyethylene terephthalate (PET) or polyester, which has a good thermal conductivity which allows heat to be efficiently transferred to the condensate trap 40. The two sheets 70, 72 can each have a thickness of between about 0.2 mm and about 0.3 mm.

The two sheets 70, 72 can be adhered together to encase the trace 14 using a dielectric adhesive 74, which can have a thickness which is about equal to the thickness of the conductive layer which forms the trace 14 and the electrodes 16, 18. FIG. 4 further depicts an adhesive 76, such as a pressure sensitive adhesive. Adhesive 76 can be, for example, acrylic, and can have a thickness of between about 0.05 mm and about 0.07 mm. FIG. 4 further depicts a removable cover 78 which protects the pressure sensitive adhesive 76 prior to attachment to the condensate trap 40. In another embodiment, the adhesive can be one which is activated using, for example, moisture, and the cover 78 can be omitted.

Thus an embodiment of the present teachings can provide a low voltage (i.e., 5V, 24V, or another low voltage), single- or multi-surface heating mat that adheres directly to a body of a condensate trap. The heating mat can be very thin and flat, and can cover a majority of the surface area of the condensate trap. The heating mat can include a cable 32 having wire leads as depicted in FIG. 1 that attach to a 24V Underwriters Laboratories (UL) Class II transformer. The control thermostat 34 can be integrated into the leads of the cable 32 and located in the ambient air. The control thermostat can be configured to turn off the heating mat when the ambient temperature rises above freezing or another setpoint, and to turn on the heating mat when the ambient temperature falls below freezing or another setpoint.

Heaters that run at 120V have safety requirements that make them more difficult and expensive to use (e.g., GFCI outlets, grounding requirements, enclosures, etc.). An embodiment of the present teachings includes a low voltage heating mat design that abates many of these concerns, which can simplify installation of the heating mat 10 compared to installation of conventional freeze protection. The heating mat 10 can be designed for operation at a voltage which is already supplied by most conventional furnaces, for example 24V supplied from a transformer 80 (FIG. 3), such that a heating mat so designed can be attached to this already-available power source. In another embodiment, power can be supplied to the heating mat 40 from a power source 82 which is external to the furnace 50.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, —20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material or layer in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A heating mat for a furnace condensate trap, comprising;
  a resistive heating trace comprising a first end terminating in a first electrode and a second end terminating in a second electrode;
  a mat cable electrically coupled to the first electrode and the second electrode, wherein the mat cable is configured to supply power to the heating mat during operation of the heating mat; and
  an adhesive configured to attach the heating mat to one or more external surfaces of a furnace condensate trap, wherein the heating mat has a thickness between about 0.67 mm and about 1.5 mm and is configured to prevent freezing of water within the furnace condensate trap.

2. The heating mat of claim 1, wherein the mat cable is configured to supply about 24V to the resistive heating trace during operation of the heating mat.

3. The heating mat of claim 1, wherein the mat cable is configured to receive about 24V from a transformer within a furnace.

4. The heating mat of claim 1, wherein the mat cable is configured to receive about 24V from a power source that is external to the furnace.

5. The heating mat of claim 1, further comprising a cutout configured to receive a condensate drain pipe which extends from a face of a furnace condensate trap.

6. The heating mat of claim 1, further comprising:
  only a single section configured to cover only a single face of a furnace condensate trap, wherein the resistive heating trace extends and meanders across the single section of the heating mat to heat an interior of the furnace condensate trap through only the single face.

7. The heating mat of claim 1, further comprising:
  a first section configured to cover a front face of a furnace condensate trap;
  a second section configured to cover a first side of the furnace condensate trap;
  a third section extending continuously from the second section and configured to cover a third side of the furnace condensate trap;
  a fourth section configured to cover a back face of the furnace condensate trap which is opposite the front face; and
  a fifth section configured to cover a second side of the furnace condensate trap which is opposite the first side, wherein the resistive heating trace extends and meanders across each of the first section, the second section, the third section, the fourth section, and the fifth section and the heating mat is configured to heat an interior of the furnace condensate trap through the front face, the first side, the back face, the second side and the third side.

8. The heating mat of claim 7, wherein:
the second section is directly connected to the first section, the third section, and the fourth section;
the fifth section is directly connected to the fourth section; and
the third section is configured to cover a bottom of the furnace condensate trap.

9. The heating mat of claim 1, further comprising:
a control thermostat configured to enable power to the heating trace when the control thermostat senses a temperature which is at or below a setpoint and to disable power to the heating trace when the control thermostat senses a temperature which is at or above the setpoint.

10. The heating mat of claim 9, wherein the control thermostat is integrated into the mat cable.

11. The heating mat of claim 1, further comprising:
a control thermostat configured to enable power to the heating trace upon receipt of a first temperature which is below a setpoint from a temperature sensor located within a furnace condensate trap, and further configured to disable power to the heating trace upon receipt of a second temperature which is above a setpoint from the temperature sensor located within the furnace condensate trap.

12. A furnace condensate trap, comprising:
a condensate trap body for storing a condensate;
a condensate input pipe attached to the condensate trap body and configured to receive the condensate;
a condensate output pipe attached to the condensate trap body and configured to drain the condensate from the furnace condensate trap;
a heating mat attached to one or more external surfaces of the condensate trap body with an adhesive and comprising:
a resistive heating trace; and
a heater cable electrically coupled to the resistive heating trace,
wherein the heater cable is configured to supply power to the resistive heating trace during operation of the furnace condensate trap and the heating mat is configured to prevent freezing of water within the furnace condensate trap.

13. The condensate trap of claim 12, wherein the heater cable is configured to supply about 24V to the resistive heating trace during operation of the heater.

14. The condensate trap of claim 12, wherein the heater cable is configured to receive about 24 V from a transformer within a furnace.

15. The condensate trap of claim 12, wherein the heater further comprises a cutout and the condensate output pipe extends through the cutout.

16. The condensate trap of claim 12, wherein the heating mat comprises:
a first section configured to cover a front face of the condensate trap body;
a second section configured to cover a first side of the condensate trap body;
a third section extending continuously from the second section and configured to cover a third side of the condensate trap body;
a fourth section configured to cover a back face of the condensate trap body which is opposite the front face; and
a fifth section configured to cover a second side of the condensate trap body which is opposite the first side,
wherein the resistive heating trace extends and meanders across each of the first section, the second section, the third section, the fourth section, and the fifth section and the heating mat is configured to heat an interior of the furnace condensate trap through the front face, the first side, the back face, the second side and the third side.

* * * * *